United States Patent [19]

Ferrill, Jr.

[11] 4,127,421

[45] Nov. 28, 1978

[54] PROCESS FOR GRANULATING LEAD CHROMATE-CONTAINING PIGMENTS

[75] Inventor: Richard M. Ferrill, Jr., Glens Falls, N.Y.

[73] Assignee: Hercules Incorporated, Wilmington, Del.

[21] Appl. No.: 826,483

[22] Filed: Aug. 22, 1977

[51] Int. Cl.$^2$ ............................................... C08K 9/10
[52] U.S. Cl. ............................... 106/298; 106/308 M; 106/309; 260/42.55
[58] Field of Search ................ 260/42.55; 106/308 M, 106/298, 309

[56] References Cited

U.S. PATENT DOCUMENTS

| | | | |
|---|---|---|---|
| 3,586,654 | 6/1971 | Lerman et al. | 106/308 M |
| 3,755,244 | 8/1973 | Hart | 260/42.55 |
| 3,773,535 | 11/1973 | Burgyan et al. | 106/308 M |

FOREIGN PATENT DOCUMENTS 675,170 12/1963 Canada .................................. 260/42.55

*Primary Examiner*—James H. Derrington
*Attorney, Agent, or Firm*—Hazel L. Deming

[57] ABSTRACT

A process is described for the production of high yields of lead chromate-containing pigments in a nondusting granular form. The process involves agitating in aqueous medium designated amounts of a lead chromate-containing pigment, a friable, low molecular weight hydrocarbon-type resin softening at 50°–95° C. and a cationic surfactant at a temperature above the softening point of the resin and continuing agitation at a temperature within the range of about 5° to about 20° C. above the softening point of the resin until the pigment dispersion is granulated. The process provides yields of at least 70% of granules in the particle size range of about 0.1 to about 4 millimeters. The granules are particularly useful as colorants for air-drying enamel coating systems and plastics.

10 Claims, No Drawings

PROCESS FOR GRANULATING LEAD CHROMATE-CONTAINING PIGMENTS

This invention relates to lead chromate-containing pigments and more particularly to an aqueous process for producing high yields of nondusting granules of lead chromate-containing pigment compositions which are particularly suitable for the coloring of air-drying enamel coating systems and plastics.

The lead chromate-containing pigments are relatively inexpensive, are available in a wide range of colors from greenish yellow to dark red, and have excellent tinctorial properties and good dispersibility characteristics. For reasons of economy they are generally produced and used in a pulverized powdery form which is dusty and requires careful handling to avoid contamination. The problem of handling dusty materials is of general concern to environmentalists but becomes a matter of particular concern when dealing with chemicals such as pigments. Thus, there exists a serious need for an efficient and inexpensive method for treating lead chromate pigments to reduce dusting without detracting from their high tinctorial properties and dispersibility characteristics and enable their general use as economical colorants.

In the past various methods have been described for producing nondusting, granular pigment compositions. One method is described in British Pat. Nos. 1,178,846 and 1,238,118 and involves adding a melt or a solution of a low molecular weight granulating agent having a softening temperature below 100° C. in a water-immiscible organic solvent and, if desired, a wetting agent, to an aqueous suspension of pigment at a temperature below 100° C., and agitating the mixture until granules are formed, preferably at above 60° C. The granulating agents of the British patents are waxy or plasticizing type materials such as fatty acids, fatty alcohols, fatty acid or fatty alcohol esters, fatty acid amides and ester type plasticizers. High yields of granular lead chromate pigments in a desirable particle-size range, however, are not obtained with these granulating agents in the absence of an organic solvent, and the granules which are formed are of limited utility due to the softening or plasticizing effect of the agent on the systems in which they are used.

Another method is described by Hart in U.S. Pat. No. 3,755,244 and involves milling pigment and a low molecular weight polyethylene in water and then granulating the pigment dispersion in the slurry in the presence of a water-immiscible organic liquid which is at least a partial solvent for the polyethylene and a surfactant. Although nondusting, free-flowing granules can be produced in this manner, the requirement that relatively large amounts of volatile organic solvents must be used detracts considerably from any advantages achieved by the granular form of the composition and makes the process unattractive from both an economical and ecological standpoint.

Yet another method is described by Robertson et al. in German application DT No. 2,536,719 and U.S. Pat. No. 4,015,999 and involves forming pigment compositions in free-flowing, nondusting form by agitating an aqueous dispersion of pigment and a resinous carrier melting at below 100° C. in the presence of a protective colloid and optionally a water-insoluble surfactant at a temperature at which the carrier is molten until granules of the desired size are obtained. The carriers of Robertson et al. are fatty alcohols, fatty esters, fatty amides, phthalate esters, etc., or mixtures thereof, with other resins such as hydrocarbon resins, and are used in the presence of an aqueous protective colloid such as hydroxyethyl cellulose, polyethylene oxide, polyvinyl alcohol and the like. Very few if any granules of lead chromate pigment compositions are formed by practicing the teachings of Robertson et al.

Now, in accordance with this invention, it has been found that high yields, i.e., yields of at least about 70% and usually at least about 75% of free-flowing, nondusting granules of lead chromate-containing pigment compositions can be obtained in a manner which is attractive from both an economical and ecological standpoint. The invention further provides the advantages of a lead chromate pigment form which is readily dispersible at high pigment levels in air-drying enamel coating systems and plastics, which develops good color strength and exhibits good heat and light stability. Thus the darkening tendency normally associated with such pigments, particularly when compounded with thermoplastics, is reduced and general utility is broadened.

Accordingly, the present invention relates to a process for the production of nondusting, free-flowing granules of a lead chromate-containing pigment composition, which process comprises agitating a lead chromate-containing pigment and a friable low molecular weight hydrocarbon-type resin having a Ring and Ball softening point within the range of 50° to 95° C. in water in the presence of a cationic surfactant at a temperature above the softening point of the resin until an aqueous slurry of pigment dispersed in the resin is formed, said pigment and resin being present in a weight ratio from 7:1 to 1:1 and said resin and surfactant being present in a weight ratio of at least 2:1, continuing agitation of said slurry at a temperature within the range of from about 5° to about 20° C. above the softening point of said resin until the pigment dispersion is granulated and recovering the resulting granules.

The process of the invention, as stated, involves the following three steps: (a) agitating in aqueous medium a lead chromate-containing pigment, a friable, low molecular weight hydrocarbon-type resin softening at 50°–95° C. and a cationic surfactant at a temperature above the softening point of the resin, (b) continuing agitation at a temperature between about 5° and about 20° C. above the softening point of the resin until the pigment dispersion is granulated, and (c) recovering the granules.

By the term "lead chromate-containing pigment" is meant all pigments which include lead chromate as a major constituent. These range from relatively pure lead chromate in monoclinic form to solid solutions containing lead sulfate or lead molybdate or both as substantial components. Also included are the rhombic lead chromates stabilized in that crystal form in various ways such as by the addition of trivalent aluminum ions and pyrophosphate ions. Although basic lead chromate orange pigments have been largely supplanted in the trade by the molybdate oranges, they are to be included as pigments which may be treated as herein disclosed.

Among specific lead chromate pigments to which the invention is applicable are the following, all references being to "Colour Index", 2nd edition, 1956, published jointly by the Society of Dyers and Colourists, England, and the American Association of Textile Chemists and Colorists, United States:

Chrome Yellow CI-77600
Basic Lead Chromate CI-77601

Lead Sulfochromate CI-77603
Molybdate Orange or Red CI-77605.

The preferred lead chromates include the very green shade primrose yellow in rhombic crystal form; the relatively pure lead chromate which is much redder, is in monoclinic crystal form and is commonly known as medium yellow; the intermediate shades which are solid solutions of lead chromate and lead sulfate and are usually in monoclinic form; and the molybdate oranges and reds in tetragonal or monoclinic form. Also included herein are the lead chromates which have been end-treated with relatively small amounts of one or more oxide-type materials such as silica, alumina, antimony, titanium or cerium oxides, and the like, which are known to improve the chemical, thermal and/or light resistance of the pigments.

The friable, low molecular weight hydrocarbon-type resins employed in this invention are noncrystalline thermoplastic synthetic polymers having a Ring and Ball softening point of from 50° C. to 95° C., preferably from 50° C. to about 75° C.; a molecular weight within the range of from about 300 to about 1000, preferably from about 500 to 900; and an acid number of less than about 1. The hydrocarbon resins which have the above properties can be aliphatic, cycloaliphatic or aromatic-type hydrocarbons and include: the petroleum resins obtained by the catalytic polymerization of a mixture of monomers derived from the deep cracking of petroleum, which monomers are chiefly mono- and diolefins; the polyterpene resins obtained by the polymerization or copolymerization of terpene hydrocarbons such as the alicyclic, monocyclic and bicyclic terpenes and their mixtures, including alloocimene, carene, isomerized pinene, pinene, dipentene, terpinene, terpinolene, turpentine, a terpene cut or fraction, and various other terpenes; polymers of unsaturated coal tar by-products such as the polyindenes and coumarone-indene resins; the styrene resins, as for example, polystyrene, poly(α-methyl styrene), styrene-olefin and styrene-diolefin copolymers, styrene-terpene copolymers, styrene-vinyl toluene copolymers, α-methyl styrene-vinyl toluene copolymers, styrene-α-methyl styrene copolymers, etc.; and the hydrogenated form of any of the above types of resins produced by any of the usual hydrogenation processes, generally carried out utilizing a catalyst such as nickel, nickel-on-kieselguhr, copper chromite, palladium-on-carbon, platinum-on-alumina, or cobalt plus zirconia or kieselguhr and preferably in the presence of a solvent such as methyl cyclohexane, toluene, p-menthane, etc. at pressures ranging from 500 to 10,000 p.s.i. and a temperature of 150° to 300° C. All of the above hydrocarbon resins can be prepared by methods known in the art. The hydrocarbon-type resins are relatively stable to light and heat, are also fully thermoplastic and at temperatures above their melting points are free-flowing liquids of low viscosity (dependent upon temperature) which return to the solid state upon cooling. The preferred resins have a melt viscosity at 100° C. between about 1 and about 10,000 poises. Typical resins of the above types are the coal and/or petroleum-derived—aromatic hydrocarbon resins commercially available as the Piccomer Resins, the Picco 6000 Resins and the Piccovar AP, D and L series Resins; the aliphatic, petroleum-derived resins such as the Piccopale Resins, Piccotac Resins and Piccodiene Resins; the terpene hydrocarbon resins commercially available as the Piccolyte Resins; and the styrene resins commercially available as the Piccolastic Resins, Piccotex Resins and Kristalex Resins, all of which resins are manufactured by Hercules Incorporated.

Particularly useful are the low molecular weight, friable cycloaliphatic and aromatic hydrocarbon resins and of these the styrene resins which are homopolymers of styrene and alkyl substituted styrenes, copolymers of styrene and alkyl substituted styrenes and copolymers of alkyl substituted styrenes with each other are particularly useful. The preferred styrene resins have a number average molecular weight within the range of about 400 to about 1000 and preferably 450 to 850, a Ring and Ball softening point within the range of 50° C. to about 85° C., and preferably about 75° to about 85° C. and a melt viscosity at 100° C. of about 50 to 3000 poises. Most preferred are the homopolymers of styrene or of lower alkyl and preferably methyl substituted styrene such as α-methyl styrene or vinyl toluene, and copolymers of such monomers with each other such as, e.g., copolymers of α-methyl styrene with up to about 95%, and preferably from about 10 to about 50% of styrene; copolymers of styrene with from about 5 to about 95% of vinyl toluene or copolymers of vinyl toluene with up to about 95% and preferably from about 10 to about 50% of α-methyl styrene. The hydrogenated forms of the above homopolymers and copolymers can also be used, in which case the resins have reduced aromatic unsaturation and a narrower molecular weight distribution. Usually, when hydrogenated resins are employed, at least about 10% and preferably at least about 25% of the aromatic unsaturation is reduced. The friable styrene resins are known resins and are conventionally prepared by polymerizing the desired styrene monomer or mixtures of the styrene monomers in the presence of a Lewis acid such as $BF_3$ etherate or aluminum chloride or by other known processes which give polymers in the desired molecular weight range. Hydrogenation, if desired, is conventional and techniques for the hydrogenation of aromatic rings are well known. Hydrogenation is preferably accomplished by a standard practice using a nickel catalyst.

The amount of hydrocarbon resin used can vary within relatively large limits depending upon the concentration of pigment desired. In practice it has been found that a pigment to resin ratio between about 7:1 and 1:1 and preferably 4:1 to 2:1 provides optimum yields of granules.

As stated, the lead chromate-containing pigment and the friable hydrocarbon resin are agitated in water in the presence of a cationic surfactant. Preferred cationic surfactants are the substituted tertiary amines which are heterocyclic tertiary amines such as the alkyl imidazolines and oxazolines, the polyethoxylated tertiary amines, primary amines such as dehydroabietylamine and tallow amine and quaternary ammonium compounds such as the quaternary ammonium chlorides derived from adducts of $C_{12}$ to $C_{18}$ fatty acid amines and about 2 to 15 moles of ethylene oxide. One of the preferred imidazolines is 1-(2-hydroxyethyl)-2-n-heptadecenyl-2-imidazoline. The cationic surfactants are capable of forming water-soluble salts with various acids and water-insoluble salts with alkali or anionic surfactants. As their acetate salts they are excellent surfactants with good solubility in water. The water-insoluble, oil-soluble form of such surfactants, as for example, complexes of the above amine surfactants with anionic surfactants are also useful provided a stoichiometric excess such as at least 10% and preferably 10 to 70% molar excess of the cationic surfactant is present.

Typical anionic surfactants include sodium oleate, sodium laurate, sodium palmitate, sodium stearate, sodium naphthenate, sulfonated castor oil, sulfonated petroleum, sulfonated tall oil, sodium butyl naphthalene sulfonate, wood rosins and the like. Particularly useful are the commercially available anionic surfactants such as Tergitol 4 (the sodium sulfate derivative of 7-ethyl-2-methyl-4-undecanol), Igepon AC-78 (the coconut oil acid ester of sodium isethionate), Aerosol 22 (tetrasodium-N-(1,2-dicarboxyethyl)-N-octadodecyl sulfosuccinimate) and Staybelite (hydrogenated wood rosin).

The choice and amount of surfactant will, of course, vary depending upon a number of factors which include the HLB value of the surfactant or surfactant combination and the surface characteristics of the pigment. Generally, the surfactant should be present in an amount such that the resin to surfactant weight ratio is at least 2:1 and preferably from about 2.5:1 to about 3.5:1 if the advantages of the invention are to be realized in full.

The process of this invention can also be carried out in the presence of up to about 25% by weight of the pigment of one or more resinous granulating agents which will facilitate and/or control granule formation and, in certain instances, will also aid in wetting of the pigment or friable resin and/or transfer of the pigment from the water to the resin phase. The presence of a granulating agent is optional and usually not required, but if present will generally range from about 0.1 to about 20% by weight of the pigment. The useful granulating agents are low molecular weight liquid or low softening point resins which are water-insoluble and oil-soluble, nonvolatile and heat stable under processing and/or use conditions, nonreactive with the pigment and compatible with the hydrocarbon resin and the ingredients with which the colorants are to be used. The preferred granulating agents are the low molecular weight hydrocarbon-type resins having softening points below about 50° C. and preferably from about 5° to about 40° C. and the tacky, viscous liquid rosin esters and particularly the hydrogenated lower alkyl esters of rosin. Granulating agents of these types are commercially available as the liquid or semisolid Piccomer Resins, Piccolyte Resins, Piccovar Resins, Piccolastic Resins and Hercolyn D Resins of Hercules Incorporated. Nonionic, water-soluble protective colloid-type polymers such as the cellulose ethers or similar polymers containing hydrophilic groups should not be used since their presence has been found to interfere with or otherwise prevent granule formation in the process of this invention.

In the process of this invention the first step is carried out in water at a temperature which is above the softening temperature of the resin. The exact temperature is not critical but should be sufficiently elevated to provide the resin in a molten form which is receptive to the pigment but below a temperature which could cause degradation of the resin or pigment. Usually, a temperature of about 5° to about 50° C. above the softening point of the resin will provide adequate fluidity for pigment transfer in a convenient period of time, as, for example, 15 to 60 minutes. The amount of water present can vary over wide limits but should be sufficient to give a fluidity to the mixture which permits easy and effective mixing. Usually, the solids content will be from about 15 to 60% at this stage.

During the agitation of the aqueous pigment-resin slurry in the presence of the surfactant at a temperature above the softening temperature of the resin, the pigment transfers from the aqueous phase to the resin phase and an essentially pigment-free water phase is formed. The degree of agitation should be sufficient to insure adequate contact of the pigment and resin. High shear stress, however, is not necessary to achieve the advantages of the invention. When transfer is complete, i.e., all of the pigment is dispersed into the resin phase, the pigment dispersion is granulated by adjusting the temperature of the slurry to a range which is from about 5° to about 20° C. above the softening point of the resin while continuing agitation. Within this range, the viscosity of the resin should be sufficiently high to achieve controlled coalescence of the particles and granulation in the desired particle size range. Preferably the viscosity will range from about 50 to about 10,000 and most preferably from about 150 to about 2000 poises. Granulation is preferably carried out by adding cooling water to adjust the temperature of the slurry to the desired range, or by discontinuing the heating and permitting the slurry to cool slowly to below the softening point of the resin.

When granulation is complete, the slurry is preferably cooled so that the granules will be firm enough to be transported to separatory means for removing the bulk of the water. After dewatering, the granules are washed, if desired, and dried in conventional manner. For example, dewatering can be carried out by running the cooled batch through any type of conventional filtering apparatus such as a filter press, screen, etc. The partially dewatered granules can then be washed and dried using tray driers, vacuum driers, etc.

An important advantage of this invention is the ease, safety and economies with which high yields of non-dusting granules of lead chromate pigment compositions can be obtained. Thus, the process is commercially attractive from an economical and ecological standpoint. It also permits the manufacturer and the processor to handle the product in conventional equipment with a minimum of dust or clean up without concern for contamination of the environment or adjacent systems. Another advantage of the process is that it provides high yields of granules in a useful particle size so that subsequent processing to reduce the size of large particles to a smaller size or to a powder is unnecessary. The granules will usually range in size from about 0.1 to about 5 millimeters and preferably from about 0.5 to about 2 millimeters. Further, the granules produced in accordance with this invention are readily dispersible in air-drying enamel coating systems at high pigment levels and provide coatings and films of outstanding color strength, color values and gloss. They are also readily dispersible in plastics and exhibit improved heat stability over pigments which have not been treated in accordance with this invention.

Having described the invention generally, the following examples are given to illustrate specific embodiments thereof. All parts and percentages are by weight unless otherwise indicated.

EXAMPLE 1

A vessel equipped with an agitator and heating means was charged with light chrome yellow pigment presscake containing 224 parts (dry basis) of Pigment Yellow 34 (CI No. 77603) and sufficient water to provide a charge equal to 1600 parts by volume. The agitator was turned on, and the charge was heated to 55° C., following which time 9.6 parts of a coconut oil ester of sodium isethionate (0.023 equivalents of anionic surfactant) and a sufficient amount of a 5% aqueous sodium carbonate solution were added to adjust the pH of the slurry to 7.0. Agitation was continued while maintaining the temperature of the slurry at 55°-60° C., and after 30 minutes time 48.0 parts of molten polystyrene at 100° C. were added and the mixture was heated to 80° C. and maintained thereat for 30 minutes. The polystyrene had a number average molecular weight of about 520, a Ring and Ball softening point of about 50° C., an acid number less than 1 and a melt viscosity at 100° C. of about 3 poises. Next 48 parts of an aqueous solution containing 12 parts of dehydroabietylamine (0.038 equivalents of cationic surfactant) and 2.4 parts of glacial acetic acid were added, the pH of the slurry was adjusted to 6.5, water at 80° C. was added to adjust the volume to 3500 parts, the diluted slurry was cooled to 60° C. and the slurry was agitated for an additional 150 minutes at 60° C. The batch was then run out onto a 40 mesh screen and the dewatered material was dried in an oven at 70° C. The product was 232 parts (79% yield) of a finely-divided granular pigment composition containing about 76.3% of the lead chromate based on the weight of the composition. The granules were nondusting, essentially spherical, free-flowing particles, the majority of which had a diameter between 0.5 and about 1.5 millimeters.

EXAMPLE 2

The procedure of Example 1 was repeated except that the mixture was heated to 90° C. for 30 minutes and, following adjustment of the slurry to a pH of 6.5, heating was discontinued and the slurry was agitated until the temperature was 40° C. (about 75 minutes). The dried product was 256 parts (87.2% yield) of nondusting, free-flowing granules having a diameter range between about 0.5 and 1.0 millimeters.

The dispersibility characteristics of the pigment composition of this example were evaluated in an air-drying alkyd enamel as follows. A yellow enamel paste formulation was prepared by stirring 159.4 parts of the granules of this example with 47.2 parts of a commercial soya-linseed, medium oil alkyd resin (Aroplaz 1445-M50) and 32.8 parts of mineral spirits for 15 minutes using a small Cowles dispersing blade at 5000 rpm, adding 306 parts of sand (20-30 mesh) and continuing stirring for an additional 15 minutes using a sand mill type impeller blade. Following removal of the sand, the paste gave a Hegman gauge reading greater than 7. An enamel was produced from the above paste by stirring 75 parts of the paste with 71.4 parts of the Aroplaz resin, 2.7 parts of mineral spirits, 1.1 part of lead drier and 0.3 part of cobalt drier until uniform and adjusting the viscosity to 20-25 sec., #4 Zahn cup. The enamel was then sprayed onto standard test panels (size 3 × 9 inches) to give a coating thickness of 0.7 mil and the panels were dried at room temperature for 48 hours.

The resulting panels had a smooth, glossy, bright yellow surface. Exposure in a Cleveland humidity cabinet for 24 hours at 66° C. did not significantly alter the smooth, glossy surface of the panels. When the panels were tested in a Weatherometer, the color after 100 hours was slightly darker than a nonexposed panel, but deemed fully satisfactory. Control panels were also prepared and evaluated in the same manner as above except that the enamel was formed using 120 parts of powdered Pigment Yellow 34 in place of the 159.4 parts of the granules of this example and additional Aroplaz resin was added to provide enamels of equal solids content.

Visual comparison of the panels coated with the test and control paints showed that the test paint (prepared from the granules of this example) were substantially equal in all respects to the control paint.

EXAMPLE 3

The procedure of Example 2 was repeated except that an equal amount of a hydrogenated homopolymer of styrene having about 95% of its initial aromatic unsaturation reduced, a softening point of about 61° C., a number average molecular weight of about 525-550, an acid number of less than 1 and a viscosity of about 3 poises at 100° C. was substituted for the polystyrene. The product of this example (84.8% yield) was in the form of nondusting, free-flowing granules. When the granules were dispersed in enamel and coated panels were prepared therefrom and evaluated in the same manner of Example 2, the enamel containing the granules of this example was equal in all respects to the control enamel.

EXAMPLE 4

The procedure of Example 2 was repeated except that the amount of anionic surfactant was increased to 11.5 parts (0.028 equivalents) and 72.0 parts of polystyrene were used. The product was 309 parts (96.7% yield) of a free-flowing, nondusting granular pigment composition containing about 70.1% of the lead chromate based on the weight of the composition.

EXAMPLE 5

The procedure of Example 2 was repeated except that the presscake contained 224 parts (dry basis) of molybdate orange pigment (Pigment Red 104, Color Index No. 77605) instead of the light chrome yellow pigment. The product was 229 parts (78.0% yield) of free-flowing, nondusting granules having an approximate diameter of 0.5-1.5 millimeters and containing about 76.3% of the orange pigment.

EXAMPLE 6

The procedure of Example 1 was repeated except that following adjustment of the pH of the slurry to 7.0, 48.0 parts of a powdered polyterpene resin having a number average molecular weight of about 700, a Ring and Ball softening point of about 70° C., an acid number less than 1 and a melt viscosity at 100° C. of about 200 poises were added, the mixture was stirred for 5 minutes, 48.0 parts of an aqueous solution containing 12.0 parts of dehydroabietylamine and 2.4 parts of glacial acetic acid were added, the pH was adjusted to 6.5, the slurry was heated to 90° C. and stirred for 2 hours at 90°-95° C., about 1600 parts of water at 25° C. were added and the slurry was agitated for 2 minutes before running out onto a 40 mesh screen. Following drying at 70° C., the product was 236 parts (80.2% yield) of nondusting, free-flowing granules having an approximate diameter of 0.5 to 2 millimeters and containing 76.3% pigment based on the weight of the product.

EXAMPLE 7

When the procedure of Example 6 was repeated except that the amount of the polyterpene resin was increased to 72.0 parts and the slurry was heated to 75°-80° C. and stirred thereat for 2 hours instead of at 90°-95° C., 258 parts (81.0% yield) of nondusting, free-flowing granules having an approximate diameter of 0.5 to 1.0 millimeter and containing 70.5% of the pigment were obtained.

EXAMPLE 8

The procedure of Example 6 was repeated except that 72.0 parts of an aromatic hydrocarbon resin produced from coal-derived monomers and having a number average molecular weight of about 625, a Ring and Ball softening point of about 75° C., an acid number less than 1, and a melt viscosity at 100° C. of about 1000 poises were substituted for the 48.0 parts of the polyterpene resin. The product was 295 parts (92.8% yield) of nondusting, free-flowing granules having an approximate diameter of 0.5 to 1.0 millimeter and containing 70.5% of pigment based on the weight of the product.

EXAMPLE 9

The procedure of Example 8 was repeated except that an equal amount of a copolymer of vinyl toluene and α-methylstyrene (75:25) having a number average molecular weight of about 770, a softening point of 75° C., an acid number less than 1 and a melt viscosity at 100° C. of 100 poises was substituted for the polymer of Example 8. The product was 280 parts (88.1% yield) of free-flowing, nondusting granules having an approximate diameter of 0.5 to 4.0 millimeters.

EXAMPLE 10

The procedure of Example 8 was repeated except that an equal amount of a polystyrene having a number average molecular weight of 780, a softening point of 75° C., an acid number less than 1, and a melt viscosity at 95° C. of 100 poises was substituted for the polymer of Example 8. The product was 289 parts (91.1% yield) of free-flowing nondusting granules having an approximate diameter of 0.5 to 3.0 millimeters.

The granules of this example were evaluated in polypropylene at a 0.5% pigment level by dry blending 2.8 parts of the lead chromate granules with 397.2 parts of commercial polypropylene flake in a paint shaker, passing the blended sample three times through a one inch laboratory extruder at 204° C., pressing out the sample on a Carver press at 204° C. and at 20,000 p.s.i. into 4 × 4 inch test plaques, 20 mils thick, and then heating the plaques in the press for an additional 10 minutes at 232° C. Visual comparison of the test plaques with a control plaque which had not been heated for 10 minutes at 232° C. showed very slight darkening, indicating that the product of this example possessed good heat stability characteristics. When the above evaluation was repeated except that an equal amount on a pigment basis of powdered Pigment Yellow 34 (CI 77603) was substituted for the granules of this example, the plaques darkened very badly, indicating very poor heat stability.

When the procedure of this example was repeated except that no cationic surfactant was used and the amount of the anionic surfactant was increased to 24 parts, the product was 38.5 parts (12.1% yield) of sticky granules.

EXAMPLE 11

A vessel equipped with an agitator and heating means and charged with 2400 parts by volume of an aqueous slurry containing 224 parts (dry weight) of the pigment presscake of Example 1 and water was heated to 50° C. with agitation, following which time 9.6 parts of the anionic surfactant of Example 1 were added, the pH was adjusted to 8.4 and agitation was continued for 30 minutes at 50°–55° C. While continuing agitation, 36 parts of the polymer of Example 9 and then 36 parts of a resinous liquid methyl ester of hydrogenated rosin were added, the mixture was heated to 90°–95° C. and maintained at 90°–95° C. for 30 minutes, after which time 40 parts of an aqueous solution containing 10.0 parts of dehydroabietylamine and 2.0 parts of glacial acetic acid were added and the pH was adjusted to 6.7. The heat was then turned off and the slurry was agitated until the temperature reached 40° C. (approximately 75 minutes). The slurry was run onto a 40 mesh screen to collect the granules, the granules were washed three times with cold water and the washed granules were oven-dried at 70° C. for 16 hours. The product of this example was about 273 parts (86.5% yield) of nondusting granules containing about 70.9% of pigment based on the product. The granules had a diameter of about 1–2 millimeters.

EXAMPLE 12

A vessel equipped with agitator and heating means was charged with 1800 parts by volume of a slurry containing 80.0 parts (dry weight) of light chrome yellow pigment presscake and water, agitation was commenced and the slurry was heated to 65° C. Sufficient dilute acetic acid was added to adjust the pH to 4.0, 120 parts of an aqueous solution containing 9.48 parts of tallow amine (0.034 equivalents of cationic surfactant) and 2.5 parts of 100% acetic acid were added over a 5-minute period, the slurry was heated to 90° C., and the pH was adjusted to 7.5 with 10% aqueous sodium hydroxide. Next 60 parts of the polymer of Example 8 were added to the slurry, agitation was continued for 30 minutes at 90°–95° C., 100 parts by volume of an aqueous solution containing 10.5 parts of partially hydrogenated wood rosin having an acid number of 160 (0.030 equivalents of anionic surfactant) and 1.2 parts of sodium hydroxide were added, the pH was readjusted to 7.5, the slurry was agitated for 120 minutes at 90°–95° C. and then an equal volume of cold water was added to reduce the temperature to 60° C. Following run out of the slurry onto a 40 mesh screen and drying of the resulting granules, the product of this example was 132 parts (82.6% yield) of free-flowing, nondusting granules containing 50% of pigment based on the weight of the product.

What I claim and desire to protect by Letters Patent is:

1. A process for the production of high yields of nondusting, free-flowing granules of a lead chromate-containing pigment composition, which process comprises (a) forming an aqueous slurry of a lead chromate-containing pigment dispersed in a friable hydrocarbon resin having a Ring and Ball softening point within the range of 50° to 75° C. and a number average molecular weight range of 500 to 900 by agitating said pigment and resin in water in the presence of a cationic surfactant at a temperature above the softening point of the resin, said pigment and resin being present in a weight ratio from 7:1 to 1:1 and said resin and surfactant being present in a weight ratio of from about 2.5:1 to about 3.5:1, (b) continuing agitation of said slurry at a temperature within the range of from about 5° to about 20° C. above the softening point of said resin until the pigment dispersion is granulated and (c) recovering the resulting granules.

2. The process of claim 1 wherein the friable resin is an aliphatic, cycloaliphatic or aromatic hydrocarbon resin.

3. The process of claim 2 wherein the hydrocarbon resin is an aromatic hydrocarbon resin derived from coal and petroleum sources.

4. The process of claim 3 wherein the resin is hydrogenated.

5. The process of claim 2 wherein the hydrocarbon resin is a terpene hydrocarbon resin.

6. The process of claim 2 wherein the hydrocarbon resin is polystyrene.

7. The process of claim 6 wherein the resin is hydrogenated.

8. The process of claim 2 wherein the hydrocarbon resin is a copolymer of vinyl toluene and α-methyl styrene.

9. The process of claim 8 wherein the aqueous slurry also contains from 0.1 to 20% by weight of the pigment of a resinous granulating agent.

10. The process of claim 9 wherein the granulating agent is a low molecular weight hydrocarbon resin having a softening point of about 5° to about 40° C. or a viscous liquid rosin ester.

* * * * *